US012651949B2

(12) United States Patent
Do et al.

(10) Patent No.: US 12,651,949 B2
(45) Date of Patent: Jun. 9, 2026

(54) MOTOR CORE ASSEMBLY AND MANUFACTURING METHOD FOR A MOTOR CORE ASSEMBLY

(71) Applicants: HYUNDAI MOTOR COMPANY, Seoul (KR); KIA CORPORATION, Seoul (KR)

(72) Inventors: Sang Hwa Do, Seoul (KR); Nyeon Han Hong, Gwangmyeong-si (KR); Kyoung Bum Kim, Seoul (KR); Yong Sung Jang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 787 days.

(21) Appl. No.: 17/879,553

(22) Filed: Aug. 2, 2022

(65) Prior Publication Data

US 2023/0223827 A1     Jul. 13, 2023

(30) Foreign Application Priority Data

Jan. 11, 2022    (KR) ........................ 10-2022-0004230

(51) Int. Cl.
| | |
|---|---|
| *H02K 15/12* | (2025.01) |
| *H02K 1/2791* | (2022.01) |
| *H02K 1/28* | (2006.01) |
| *H02K 15/03* | (2006.01) |

(52) U.S. Cl.
CPC .......... *H02K 15/12* (2013.01); *H02K 1/2791* (2022.01); *H02K 1/28* (2013.01); *H02K 15/03* (2013.01)

(58) Field of Classification Search
CPC .......... H02K 15/12; H02K 15/03; H02K 1/27; H02K 15/50; Y10T 29/49012; Y10T 29/49009
USPC .................................... 29/598, 596, 604, 607
See application file for complete search history.

(56) References Cited

U.S. PATENT DOCUMENTS

| | | | |
|---|---|---|---|
| 10,833,546 | B2 | 11/2020 | Do et al. |
| 12,074,486 | B2 | 8/2024 | Kameda et al. |
| 2014/0354089 | A1* | 12/2014 | Chamberlin ........... H02K 5/203 310/54 |
| 2019/0319503 | A1 | 10/2019 | Do et al. |

(Continued)

FOREIGN PATENT DOCUMENTS

| | | |
|---|---|---|
| EP | 2477312 B1 | 5/2021 |
| KR | 101638090 B1 | 7/2016 |

(Continued)

OTHER PUBLICATIONS

Office Action cited in the corresponding Korean patent application No. 10-2022-0004230; Jan. 13, 2026; 10 pp.

*Primary Examiner* — Sunil K Singh
(74) *Attorney, Agent, or Firm* — Lempia Summerfield Katz LLC

(57) ABSTRACT

A motor core assembly and a manufacturing method for the motor core assembly include a permanent magnet inside a motor that may be recovered, in its original state without damage and at a low cost, from a motor to be disposed of together with a device when the device to which the motor is applied is disposed of in a state in which the permanent magnet wrapped with an injection part is inserted into a rotor core. Accordingly, the number of manufacturing processes and the cost may be reduced.

10 Claims, 8 Drawing Sheets

(56) References Cited

U.S. PATENT DOCUMENTS

2020/0235619 A1 * 7/2020 Uchida ................. H02K 15/03
2022/0103029 A1 3/2022 Kameda et al.

FOREIGN PATENT DOCUMENTS

KR        20190119777 A    10/2019
WO         2020145410 A1    7/2020

* cited by examiner

MOTOR CORE ASSEMBLY AND MANUFACTURING METHOD FOR A MOTOR CORE ASSEMBLY

CROSS REFERENCE TO RELATED APPLICATION

The present application claims priority to Korean Patent Application No. 10-2022-0004230, filed Jan. 11, 2022, the entire contents of which are incorporated herein for all purposes by this reference.

BACKGROUND

Field of the Disclosure

The present disclosure relates generally to a motor core assembly. More particularly, the present disclosure relates to a motor core assembly and a manufacturing method for the motor core assembly. The motor core assembly and the manufacturing method are capable of recovering a permanent magnet inside a motor in its original state without damage and at low cost when the motor is disposed of by inserting the permanent magnet wrapped with an injection part into a rotor core. The motor core assembly and the manufacturing method are also capable of reducing manufacturing costs while reducing the number of manufacturing processes of the motor.

Description of the Related Art

Recently, interest in eco-friendly vehicles has rapidly increased, so research on hybrid electric vehicles (HEVs) and electric vehicles (EVs) capable of high-efficiency driving is being actively conducted.

Accordingly, the need for performance or fuel-efficiency improvement of the HEVs and the EVs is gradually increasing. For high-performance fuel efficiency, the efficiency of a driving motor applied to a vehicle should be high, which is advantageous as the torque output per unit volume of the motor increases.

As a motor to satisfy the need for high efficiency and high output, an "Interior Permanent Magnet Synchronous Motor (IPMSM)" is currently most commonly used.

A general IPMSM includes a stator in which a coil is wound and formed in an annular shape and includes a rotor positioned inside the stator and having a permanent magnet embedded therewith along an outer circumferential surface and adjacent to the stator. At a central part of the rotor, a rotating part that rotates while being integrally interlocked with the rotor is shaft-coupled around the rotating shaft.

Here, the permanent magnet embedded in the rotor generally uses a rare earth magnet. The higher the performance of motors, the more expensive the rare earth magnets used. HEVs require about 1 kg of rare earth materials and EVs require about 2 kg of rare earth materials.

In other words, in order to improve the output performance of a vehicle, an increase in the price of raw materials inevitably results.

On the other hand, when a lifespan of the vehicle is over, the driving motor is also disposed of. When the permanent magnet inside the driving motor is recovered without damage, the permanent magnet inside the waste motor may be recycled to alleviate the problem of rising raw material prices.

When a permanent magnet is inserted into a conventional rotor, a thermosetting resin such as "epoxy" is used after insertion so that the permanent magnet is attached and fixed to the rotor.

In this case, it is very difficult to recover the permanent magnet from the inside of the waste motor due to cured epoxy, and unavoidable damage occurs when the permanent magnet is recovered. Accordingly, there is a fundamental problem that recovery costs of the permanent magnet become greater than disposal costs.

Accordingly, a recent method of fixing the magnet using repulsive force of projections without using epoxy has been applied by providing a plurality of projection shapes on an inner surface where the permanent magnet is inserted and seated in the rotor. However, there is also a risk of damaging the permanent magnet due to the projections.

Therefore, there is a need to secure a structure capable of recovering the permanent magnet inside the waste motor in its original state without damage and to do so at a low cost.

The foregoing is intended merely to aid in understanding the background of the present disclosure. The foregoing should not be taken as acknowledging that the present disclosure falls within the purview of the related art that is already known to those having ordinary skill in the art.

SUMMARY

Accordingly, the present disclosure has been made keeping in mind the above problems occurring in the related art. The present disclosure is intended to provide a motor core assembly and a manufacturing method for the motor core assembly. The motor core assembly and the manufacturing method are capable of recovering a permanent magnet inside a motor in its original state without damage and at low cost when the motor is disposed of by inserting the permanent magnet wrapped with an injection part into a rotor core. The motor core assembly and the manufacturing method are also capable of reducing manufacturing costs while reducing the number of manufacturing processes of the motor.

In order to achieve the above objectives, the present disclosure provides a motor core assembly. The motor core assembly includes a rotor core provided with opening parts on one side and insertion parts indented from the opening parts, respectively, toward the inside. The motor core assembly also includes permanent magnet pockets where each permanent magnet pocket is inserted and assembled into the insertion part through the opening part of the rotor core. Each permanent magnet pocket includes a permanent magnet and an injection part wrapping the permanent magnet along a perimeter of the permanent magnet. Each permanent magnet pocket is inserted into the rotor core so that an outer surface of the injection part is in close contact with an inner surface of the insertion part.

One side of the permanent magnet pocket inserted into the rotor core of the motor core assembly according to the present disclosure may be exposed through the opening part. Grip parts may bee provided on an outer surface of an exposed side of the injection part.

The permanent magnet pocket of the motor core assembly according to the present disclosure may be configured such that the injection part wraps four surfaces, except for upper and lower surfaces, of the permanent magnet.

The injection part of the motor core assembly according to the present disclosure may have a phase change to a liquid state at a temperature no less than an operating temperature of the motor, thereby being separated from the permanent magnet.

When immersed in an acidic solution, the injection part of the motor core assembly according to the present disclosure may be decomposed, thereby being separated from the permanent magnet.

A manufacturing method for a motor core assembly is also provided according to the present disclosure. The manufacturing method includes a manufacturing step of forming a permanent magnet pocket by an insert injection of an injection part along a perimeter of the permanent magnet. The method also includes an assembling step of assembling the permanent magnet pocket and the rotor core by inserting the permanent magnet pocket into the insertion part of the rotor core.

In the assembling step of the manufacturing method for a motor core assembly, the rotor core may be heat-treated, and the permanent magnet pocket may be inserted into the insertion part of the rotor core while the rotor core is in a state of being heated.

In the assembling step of the manufacturing method for a motor core assembly, in a state in which the permanent magnet pocket may be inserted into the insertion part of the heat-treated rotor core, outer side surfaces of the rotor core may be press-fitted.

The manufacturing method may further include, after the assembling step of the manufacturing method for a motor core assembly, a recycling step of recycling the permanent magnet pocket by removing the permanent magnet pocket from the insertion part of the rotor core.

In the recycling step of the manufacturing method for a motor core assembly, the rotor core may be heat-treated. In a state in which the rotor core is heated, the permanent magnet pocket may be removed from the insertion part of the rotor core through the grip parts provided on an outer surface of the injection part.

In the recycling step of the manufacturing method for a motor core assembly, the motor core assembly may be heated to a temperature no less than the operating temperature of the motor so that the injection part has a phase change to a liquid state, whereby the permanent magnet and the injection part may be separated from each other.

In the recycling step of the manufacturing method for a motor core assembly, the motor core assembly may be immersed in an acidic solution so that the injection part is decomposed, whereby the permanent magnet and the injection part may be separated from each other.

As described above, according to the motor core assembly and the manufacturing method for the motor core assembly of the present disclosure, a permanent magnet inside a motor can be recovered in its original state without damage and at a low cost from a motor to be disposed of together with a device when the device to which the motor is applied is disposed of in a state in which the permanent magnet wrapped with an injection part is inserted into a rotor core. Thus, the number of manufacturing processes and the cost may be reduced.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Throughout the present specification, when a part "includes" a certain component, it means that other components may be further included, rather than excluding other components, unless otherwise stated.

In addition, terms such as first and/or second may be used to describe various components, but such terms are only for distinguishing the component from other components. For example, without being departed from the scope of rights according to the concept of the present disclosure, a first component may be termed as a second component, and similarly, a second component may also be termed as a first component. When a component, device, element, or the like of the present disclosure is described as having a purpose or performing an operation, function, or the like, the component, device, or element should be considered herein as being "configured to" meet that purpose or to perform that operation or function.

Hereinafter, configurations and operating principles of various embodiments of the present disclosure disclosed herein are described in detail with reference to the accompanying drawings.

Figure 1:
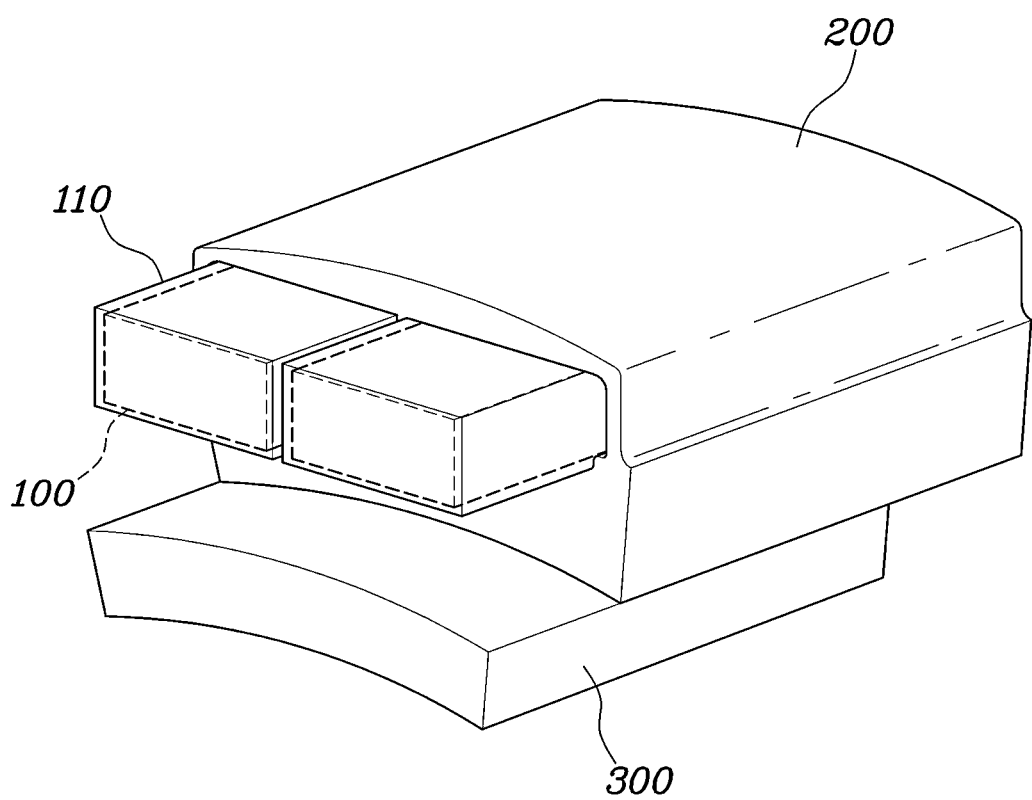
FIG. 1 is a view showing a motor core assembly according to a first embodiment of the present disclosure.
Figure 2:
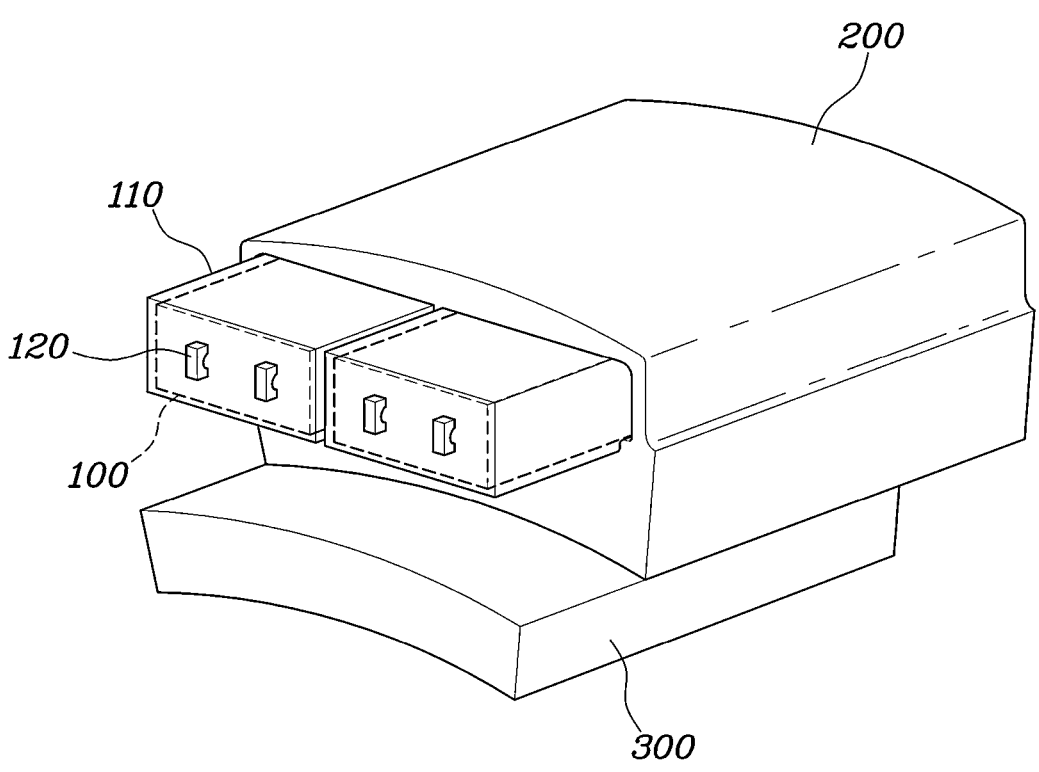
FIG. 2 is a view showing a motor core assembly according to a second embodiment of the present disclosure.
Figure 3:
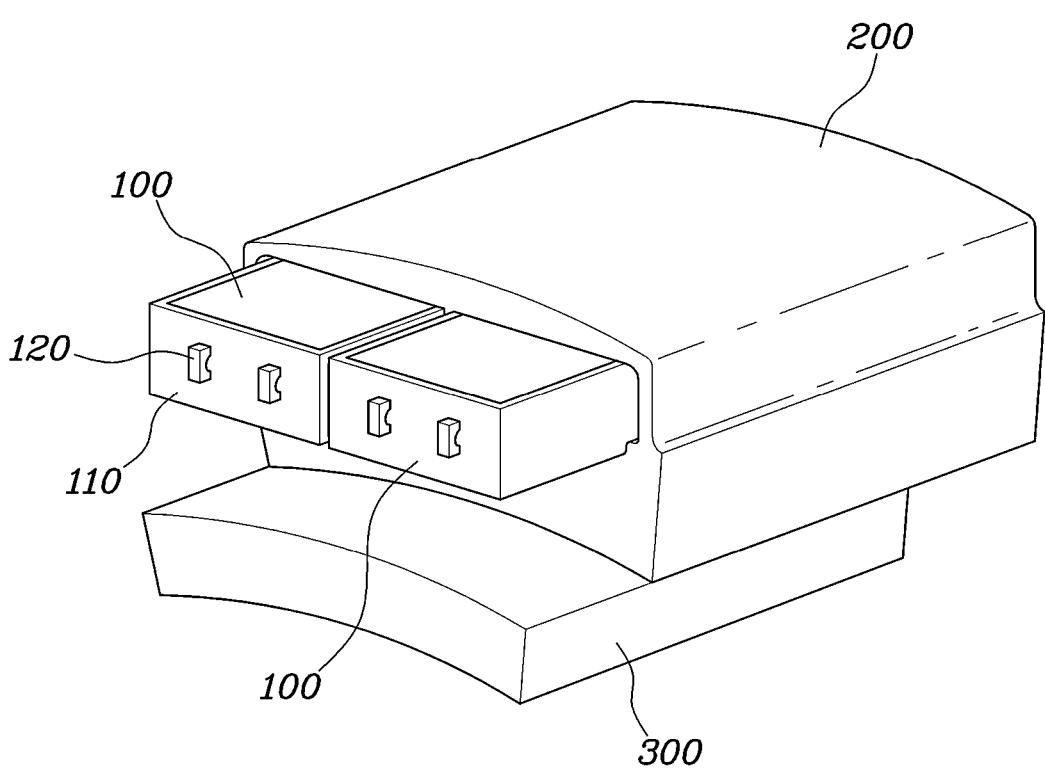
FIG. 3 is a view showing a motor core assembly according to a third embodiment of the present disclosure.
Figure 4:
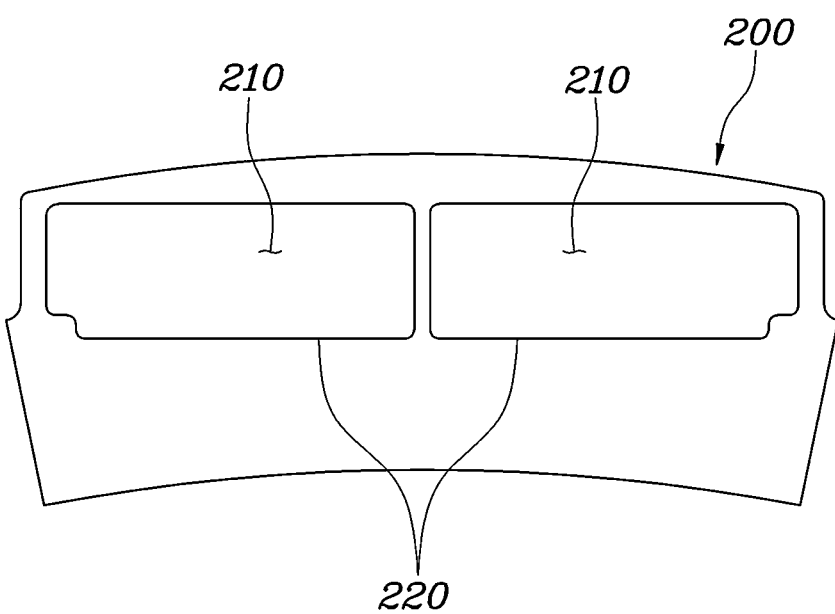
FIG. 4 is a side view of a rotor core according to an embodiment of the present disclosure.
Figure 5:
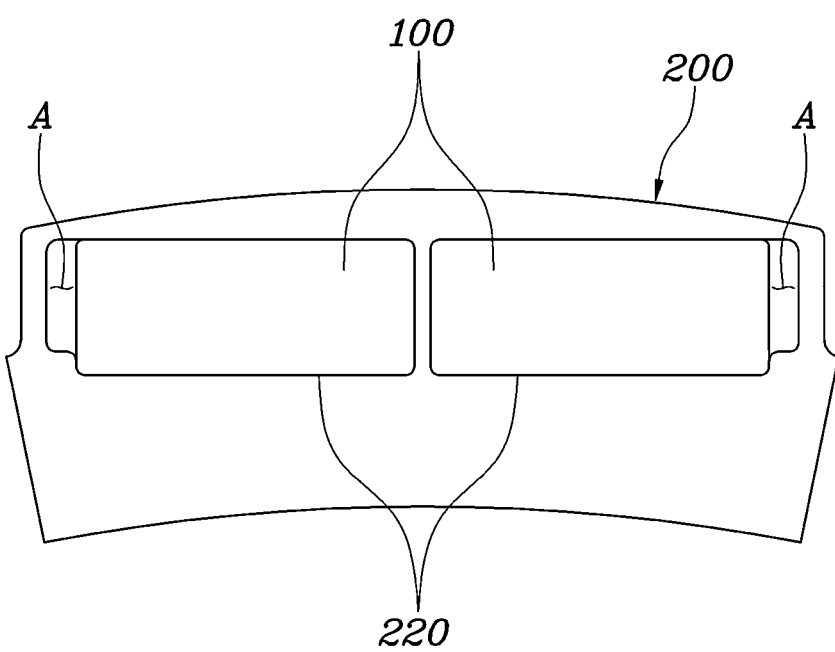
FIG. 5 is a view showing a state in which a permanent magnet is inserted into an insertion part of the rotor core in FIG. 4.
Figure 6:
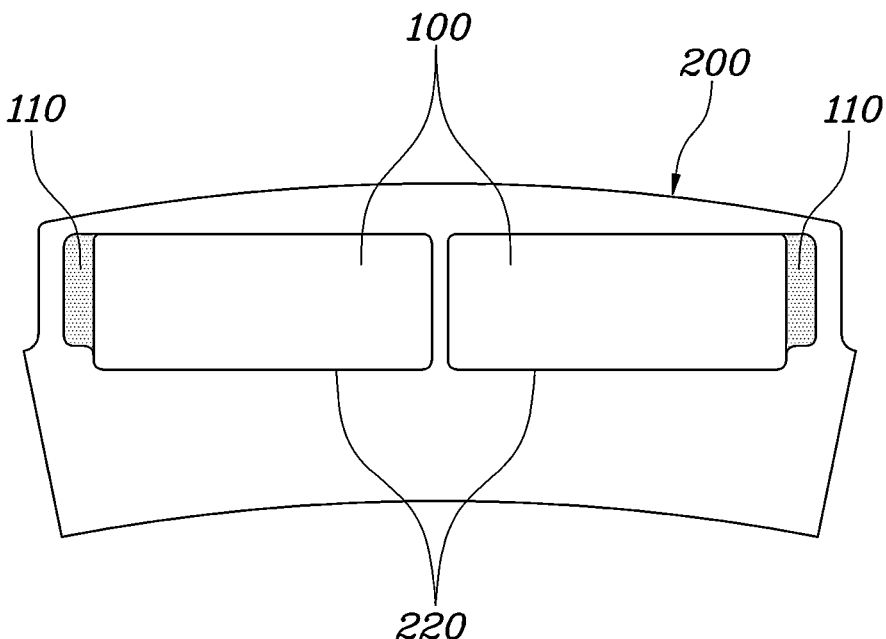
FIG. 6 is a view showing a state in which the permanent magnet wrapped with the injection part in FIG. 4 is inserted.
Figure 7:
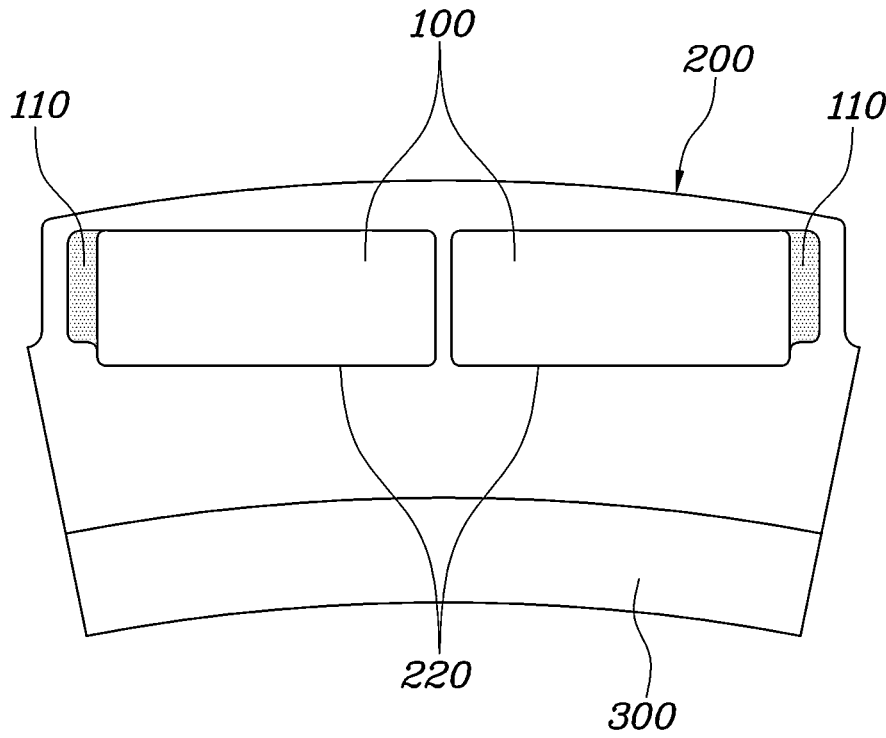
FIG. 7 is a view showing a state in which a sleeve is coupled to a lower end of the rotor core in FIG. 6.
Figure 8:
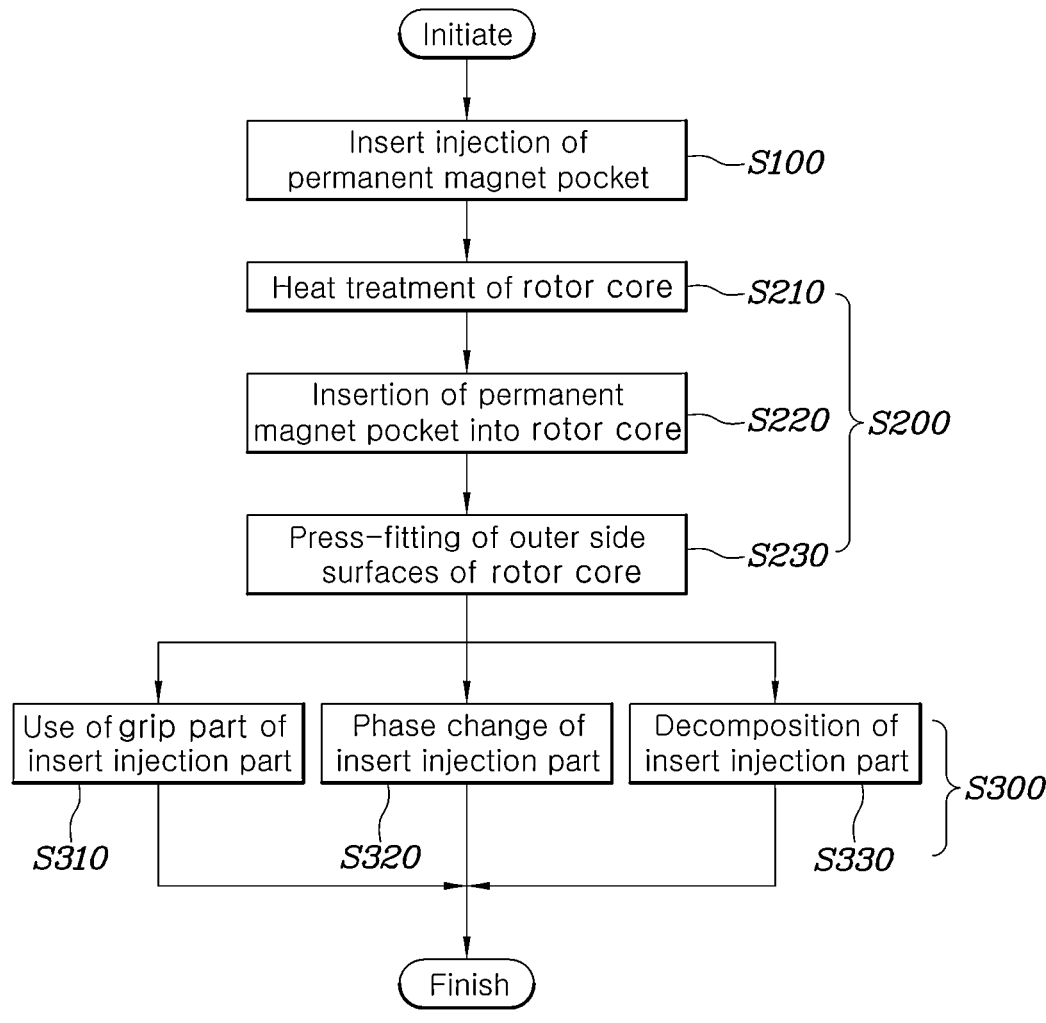
FIG. 8 is a flowchart showing a manufacturing method for a motor core assembly according to the embodiment of the present disclosure.

FIG. 1 is a view showing a motor core assembly according to a first embodiment of the present disclosure. FIG. 2 is a view showing a motor core assembly according to a second embodiment of the present disclosure. FIG. 3 is a view showing a motor core assembly according to a third embodiment of the present disclosure. FIG. 4 is a side view of a rotor core 200 according to an embodiment of the present disclosure. FIG. 5 is a view showing a state in which a permanent magnet 100 is inserted into an insertion part 210 of the rotor core 200 in FIG. 4. FIG. 6 is a view showing a state in which the permanent magnet 100 wrapped with an injection part 110 in FIG. 4 is inserted. FIG. 7 is a view showing a state in which a sleeve 300 is coupled to a lower end of the rotor core 200 in FIG. 6. FIG. 8 is a flowchart showing a manufacturing method for a motor core assembly according to the embodiment of the present disclosure.

In order to help understand the present disclosure, while basic components and manufacturing processes of a general motor are considered, key features of each component of the present disclosure are described together.

A general motor includes a stator and a rotor, and the stator and the rotor are each provided with a core part. The core part is configured to have a coil wound therein or a magnet inserted thereinto.

Accordingly, the motor core assembly according to the present disclosure has the rotor core 200 provided in the stator or rotor and a permanent magnet pocket 100 and 110 inserted into the rotor core 200 as basic components. Here, the permanent magnet pocket 100 and 110 includes the permanent magnet 100 and the injection part 110 wrapping the permanent magnet 100 along or around a perimeter of the permanent magnet 100.

On the other hand, as seen above, in order to meet the need for high efficiency and high output, the need is gradually increased in various industrial fields to which a motor is applied, such as a vehicle. Thus, an "Interior Permanent Magnet Synchronous Motor (IPMSM)" is most commonly used.

The general IPMSM includes a stator in which a coil is wound and formed in an annular shape and includes a rotor positioned inside the stator and having a permanent magnet 100 embedded therewith along an outer circumferential surface and adjacent to the stator. At a central part of the rotor, a rotating part that rotates while being integrally interlocked with the rotor is shaft-coupled around the rotating shaft.

For reference, unlike the above, the permanent magnet 100 may be embedded at the inner side of the stator and the coil may be wound inside the rotor. However, in the present specification, a form in which the permanent magnet 100 is embedded in the rotor in FIGS. 1-8 is described by way of example. In other words, this is only to help understand the present disclosure, and it should not be seen that the content of the present disclosure is limited by the disclosure of such drawings.

In this case, the permanent magnet embedded in the rotor core 200 of the rotor or stator generally uses a rare earth magnet.

Here, the rare earth magnet may be understood to mean a permanent magnet 100 made of a rare-earth raw material. Rare earth elements used in the rare earth magnets include neodymium (Nd), dysprosium (Dy), terbium (Tb), and the like. A current value for each raw material per kg is around 120,000 Korean Won ($97.20 USD) for Nd, 600,000 Korean Won ($486 USD) for Dy, and 1.6 million Korean Won ($1,296 USD) for Tb.

The higher the motor performance, the more expensive the rare earth magnets used. The rare earth materials are required for about 1 kg for the HEVs and about 2 kg for the EVs. Thus, in order to improve the output performance of a vehicle, an increase in the price of the raw materials inevitably results.

In addition, when a lifespan of the vehicle is over, the motor is also disposed of. When the permanent magnet 100 inside the motor is recovered without damage, the permanent magnet 100 inside the waste motor may be recycled to alleviate the raw material price increase problem as above.

On the other hand, looking at the manufacturing process of a conventional motor having an embedded permanent magnet 100, the permanent magnet 100 is inserted into the rotor. Then a process of bonding and fixing the permanent magnet 100 to the rotor using a thermosetting resin such as "epoxy" is utilized.

In this case, it is very difficult to recover the permanent magnet 100 from the inside of the waste motor due to cured epoxy. Also, unavoidable damage occurs when the permanent magnet 100 is recovered. Thus, a process of re-manufacturing the recovered magnet is required. Accordingly, there is a fundamental problem that the recovery cost of the permanent magnet 100 becomes greater than the disposal cost.

Recently, a method of fixing the magnet using the repulsive force of projections without using epoxy has been applied by providing a plurality of projection shapes on an inner surface where the permanent magnet 100 is inserted and seated in the rotor. However, there is also a risk of damaging the permanent magnet due to the projections.

In other words, conventionally, the permanent magnet 100 may not be easily recovered from the motor, and even when it is recovered, there is a problem in that the permanent magnet 100 is damaged or the recovery cost of the permanent magnet 100 increases. In addition, a separate coating process is required to prevent corrosion of the permanent magnet 100. Thus, there is a problem in that the total number of manufacturing processes for the motor is increased.

Accordingly, a motor core assembly according to the present disclosure is provided with a permanent magnet pocket 100 and 110 that is composed of or includes the permanent magnet 100 and the injection part 110 wrapping the permanent magnet 100 along a perimeter of the permanent magnet 100 and that is inserted into the rotor core 200. Accordingly, as a result of the injection part 110, the permanent magnet may be recovered at a low cost even without being damaged. Ultimately, the present disclosure may reduce the number of manufacturing processes and reduce material costs.

Hereinafter, the technical characteristics of each component of the present disclosure are described in more detail with reference to the accompanying drawings.

FIG. 1 is a view showing a motor core assembly according to a first embodiment of the present disclosure. FIG. 5 is a view showing a state in which a permanent magnet is inserted into an insertion part of the rotor core in FIG. 4. FIG. 7 is a view showing a state in which a sleeve is coupled to a lower end of the rotor core in FIG. 6.

With reference to FIGS. 1 and 5, the motor core assembly according to the present disclosure includes the rotor core 200 provided with opening parts 220 on one side and the insertion parts 210 indented from the opening parts 220, respectively, toward the inside of the rotor core. The motor core assembly also includes the permanent magnet pockets 100 and 110. Each permanent magnet pocket 100 and 110 is inserted and assembled into the insertion part 210 through the opening part 220 of the rotor core 200. Each permanent magnet pocket 100 and 110 is composed of or includes the permanent magnet 100 and the injection part 110 wrapping the permanent magnet 100 along a perimeter of the permanent magnet 100. Each permanent magnet pocket 100 and 110 is inserted into the rotor core 200 so that the outer surface of the injection part 110 is in close contact with the inner surface of the insertion part 210.

Specifically, the rotor core 200 is provided with the opening parts 220 provided on one side and the insertion parts 210 indented from the opening parts 220, respectively, toward the inside of the rotor core. Thus, the permanent magnet pockets 100 and 110 are allowed to be inserted into the insertion parts 210 through the opening parts 220, respectively.

In addition, each permanent magnet pocket 100 and 110 is composed of or includes the permanent magnet 100 and the injection part 110 wrapping six sides of the permanent magnet 100 along the perimeter of the permanent magnet 100. At this time, it may be understood that the permanent magnet pocket 100 and 110 is manufactured by an insert injection method.

The permanent magnet 100 is wrapped with the injection part 110, so that, not only a separate coating process for preventing corrosion of the permanent magnet 100 is not required, but also the permanent magnet 100 is protected. Accordingly, there is an effect that the permanent magnet 100 that is intact without damage may be recycled as it is, in its existing form.

Furthermore, the permanent magnet pocket 100 and 110 is manufactured by the insert injection method, so there is no need to inject an expensive material such as an existing epoxy, in a state in which the permanent magnet 100 is inserted into the rotor core 200. Accordingly, there is also the effect of reducing the number of manufacturing processes and manufacturing costs.

For reference, FIGS. 1 and 7 show the sleeve 300 together with other parts. The sleeve 300 is to support the rotor and to prevent the magnet from departing from the rotor during rotation of the rotor and is generally provided by being pressed to the bottom part of the rotor core 200 of the rotor. In other words, this is only to help understand the present disclosure, and the content of the present disclosure is not limited by the shape of these drawings.

When manufacturing the motor having a permanent magnet 100 embedded therewith, it is common to perform a process of press-fitting the sleeve 300. At this time, in order not to damage the permanent magnet 100 inside the rotor core 200, the sleeve 300 is first coupled to the rotor core 200 and then the permanent magnet 100 is inserted, or only a lower end part of the rotor core 200 is pressurized.

On the other hand, in the present disclosure, the permanent magnet 100 is wrapped with the injection part 110, and thus the permanent magnet pocket 100 and 110 is allowed to be simultaneously assembled during the press-fitting process of the sleeve 300. Accordingly, it is possible to further reduce the number of manufacturing processes of the motor.

FIG. 2 is a view showing a motor core assembly according to a second embodiment of the present disclosure.

With reference to FIG. 2, one side of the permanent magnet pocket 100 and 110 inserted into the rotor core 200 of the motor core assembly according to the present disclosure is exposed through the opening part 220. Grip parts 120 may be provided on an outer surface of one exposed side of the injection part 110.

Here, each grip part 120 is the same material as the injection part 110 and is manufactured together when the permanent magnet pocket 100 and 110 is manufactured by the insert injection method. In other words, the grip parts 120 may be provided in various shapes depending on a shape of a metal mold or a template. The content of the present disclosure should not be seen as being limited to the shape shown in FIGS. 2 and 3.

Specifically, as shown in FIG. 2, one side of the permanent magnet pocket 100 and 110 inserted into the rotor core 200 of the motor core assembly according to the present disclosure is exposed through the opening part 220. The grip parts 120 are provided on one side exposed as such. The grip parts 120 protrude on an outer surface of the injection part 110, The permanent magnet pocket 100 and 110 is thereby enabled to be easily pulled in a direction away from the insertion part 210 of the rotor core 200.

In other words, by using such a grip part or parts 120, when the motor is disposed of, the permanent magnet pocket 100 and 110 may be easily recovered from the motor. Furthermore, by recovering the permanent magnet pocket 100 and 110 manufactured by the insert injection as it is, the permanent magnet pocket 100 and 110 may be recycled by inserting the permanent magnet pocket 100 and 110 into the rotor core 200 of a new rotor.

For reference, when the permanent magnet pocket 100 and 110 is recovered from the rotor core 200 using the grip parts 120, in order to prevent damage due to friction between the permanent magnet pocket 100 and 110 and the rotor core 200 in the recovery process, a heat treatment process of thermally expanding the rotor core 200 may be performed. This process is described in detail below with reference to FIG. 8.

FIG. 3 is a view showing a motor core assembly according to a third embodiment of the present disclosure. FIG. 4 is a side view of a rotor core according to an embodiment of the present disclosure. FIG. 5 is a view showing a state in which a permanent magnet is inserted into an insertion part of the rotor core in FIG. 4. FIG. 6 is a view showing a state in which the permanent magnet wrapped with the injection part in FIG. 4 is inserted.

With reference to FIG. 3, the permanent magnet pocket 100 and 110 of the motor core assembly according to the present disclosure may be formed such that the injection part 110 wraps four surfaces, except for the upper and lower surfaces, of the permanent magnet 100.

When the motor is driven, the rotor is rotated, and when the rotor rotates, the permanent magnet 100 inserted therein vibrates in a rotational direction. At this time, vibrations according to this rotation act on cross sections of side parts except for the upper and lower surfaces of the permanent magnet 100, so the surfaces except for the upper and lower surfaces of the permanent magnet 100 should be wrapped with the injection part 110.

In addition, with reference to FIG. 5, there is an empty space provided by being spaced apart by a certain distance, such as a "volume A", between an inner surface of the insertion part 210 of the rotor core 200 and a side part of the permanent magnet 100 inserted into the rotor core 200.

Such a "volume A" is a space in which epoxy is injected in the manufacturing process of the conventional motor having a permanent magnet 100 embedded therewith. In the present disclosure, with reference to FIG. 6, the injection part 110 instead of the epoxy serves to fill the "volume A".

In the existing case, epoxy has been used to protect the permanent magnet 100 inside the motor from vibrations generated during the driving of the motor and to fix the permanent magnet 100 and has been used to minimize the vibrations by fixing the permanent magnet 100. However, epoxy is an expensive material, so there has been a need to minimize the use of epoxy. In other words, in order to minimize the use of epoxy, epoxy has been injected into only spaces around the end surfaces of the side parts except for the upper and lower surfaces of the permanent magnet 100.

Therefore, the permanent magnet pocket 100 and 110 of the motor core assembly according to the present disclosure is provided so that only four surfaces that are essential to be prevented from corrosion for the permanent magnet are wrapped with the injection part 110. Thus, waste or unnecessary use of the injection part 110 may be reduced. Accordingly, the cost of raw materials is further reduced and there is an effect that the structure of the conventional rotor core 200 in which the epoxy is injected may be used as it is without design change.

Meanwhile, the injection part 110 of the motor core assembly according to the present disclosure may experience a phase change to a liquid state at a temperature no less than the operating temperature of the motor so as to be separated from the permanent magnet 100. In addition, the injection part 110 of the motor core assembly according to the present disclosure may be decomposed when immersed in an acidic solution so as to be separated from the permanent magnet 100.

This may be understood as completely recovering only the permanent magnet 100 as it is, without recovering the permanent magnet pocket 100 and 110, which had been processed by the insert injection method.

In other words, the injection part 110 may experience the phase change to a liquid state or be decomposed by being immersed in an acidic solution. Thus, the injection part 110 wrapping the perimeter of the permanent magnet 100 is separated from the permanent magnet 100. This allows recovering only an intact permanent magnet 100.

More specifically, a typical motor is operated at a temperature of less than 200° C. In other words, the injection part 110 should be able to maintain a solid state during the normal operation of the motor. Therefore, a material, which changes phase to a liquid state only under conditions above the operating temperature of the motor, may be used as the injection part 100. Thus, when the motor is disposed of, the expensive permanent magnet 100 may be completely recovered by heating the permanent magnet pocket 100 and 110.

Similarly, a material (for example, poly diketoenamine, i.e., PDK), which is decomposed by being immersed in an acidic solution, may be used as the injection part 110. Thus, when the motor is disposed of, the expensive permanent magnet 100 may be completely recovered by immersing the permanent magnet pocket 100 and 110 in an acidic solution. For reference, "PDK", which may be used as a material, is decomposed into additives and polymers in a solution having a pH of no greater than 3, thereby being able to be separated from the permanent magnet 100.

In addition, it is natural that all materials that may change the phase to a liquid state at a temperature no less than the operating temperature of the motor or other various materials having a property of being decomposed when immersed in an acidic solution may be used as the material of the injection part 110 mentioned here. In other words, the foregoing is only provided as an example by way of description to help in understanding the present disclosure. The content of the present disclosure is not limited by such description.

FIG. 4 is a side view of a rotor core 200 according to an embodiment of the present disclosure. FIG. 5 is a view showing a state in which a permanent magnet 100 is inserted into an insertion part 210 of the rotor core 200 in FIG. 4. FIG. 6 is a view showing a state in which the permanent magnet 100 wrapped with the injection part 110 in FIG. 4 is inserted. FIG. 7 is a view showing a state in which a sleeve 300 is coupled to a lower end of the rotor core 200 in FIG. 6. FIG. 8 is a flowchart showing a manufacturing method for a motor core assembly according to the embodiment of the present disclosure.

With reference to FIG. 8, the manufacturing method for a motor core assembly according to the present disclosure is described. The manufacturing method includes a manufacturing step S100 of making, forming, or manufacturing a permanent magnet pocket by an insert injection molding of an injection part along a perimeter of the permanent magnet. The manufacturing method also includes an assembling step S200 of assembling the permanent magnet pocket and the rotor core by inserting the permanent magnet pocket into the insertion part of the rotor core.

A conventional manufacturing process requires performing a number of process steps. These include a process of inserting a permanent magnet 100 into a rotor core 200, a process of injecting epoxy, a process of waiting for a certain time until the epoxy is cured, a process of performing heat treatment of the rotor core 200, a process of coating the permanent magnet 100, and a process of assembling a sleeve 300.

On the other hand, in the manufacturing method for a motor core assembly according to the present disclosure, by inserting the permanent magnet pocket 100 and 110 manufactured by the insert injection method into the rotor core 200, the conventional epoxy injection and curing process may be eliminated. Furthermore, the permanent magnet 100 is wrapped with the injection part 110, so a separate coating process for preventing corrosion of the conventional permanent magnet 100 may also be eliminated.

In other words, by performing the manufacturing step S100 of a permanent magnet pocket by the insert injection method along a perimeter of the permanent magnet, it is possible to reduce the three processes essential in the conventional manufacturing process to just one process.

In the assembling step S200 of assembling the permanent magnet pocket and the rotor core, the permanent magnet pocket is inserted into the insertion part of the rotor core through the opening part 220 provided on one side of the rotor core 200. Thus, the permanent magnet pocket 100 and 110 manufactured by the insert injection method is inserted into the insertion part 210. Thus, the rotor core 200 and the permanent magnet pocket 100 and 110 are assembled. This is described in more detail below.

With reference to FIG. 8, in the assembling step S200 of the manufacturing method for a motor core assembly according to the present disclosure, the rotor core is heat-treated in S210 and the permanent magnet pocket is inserted into the insertion part of the rotor core while the rotor core is in a state of being heated in S220.

When the permanent magnet pocket 100 and 110 is inserted into the rotor core 200, the inner surfaces of the insertion part 210 of the rotor core 200 and the outer surfaces of the permanent magnet pocket 100 and 110 rub against each other and the surfaces of the permanent magnet pocket 100 and 110 may be damaged. Accordingly, the injection part 110 provided on the surfaces of the permanent magnet pocket 100 and 110 may be peeled off. Or, when there are surfaces of the permanent magnet 100 on which the material of the injection part 110 is not provided as necessary (for example, upper and lower surfaces of the permanent magnet), a problem in that the permanent magnet 100 is directly damaged may occur.

Therefore, in the assembling step S200 of the manufacturing method for a motor core assembly according to the present disclosure, the rotor core is heat-treated in S210 so as to be thermally expanded. In a state in which the rotor core is heated and thermally expanded in this way, the permanent magnet pocket is inserted into the insertion part of the rotor core in S200. The inner surfaces of the insertion part 210 of the rotor core 200 and the outer surfaces of the permanent magnet pocket 100 and 110 may be prevented from being rubbed against each other.

As a result, by performing such a step, a problem in that the permanent magnet 100 is directly damaged may be prevented from occurring and avoided having to be dealt with.

On the other hand, with reference to FIGS. 7 and 8, in the assembling step S200 of the manufacturing method for a motor core assembly according to the present disclosure, in a state in which the permanent magnet pocket is inserted into the insertion part of the heat-treated rotor core, outer side surfaces of the rotor core are press-fitted in S230.

As seen above, when the motor having an embedded permanent magnet 100 is manufactured, a press-fitting process of the sleeve 300 is generally performed. In order not to damage the permanent magnet 100 inside the rotor core 200, the sleeve 300 is coupled to the rotor core 200 first, and then the permanent magnet 100 is inserted, or the sleeve 300 is coupled by pressing only the lower end part of the rotor core 200. In other words, in the related art, the press-fitting process of the sleeve 300 and the inserting process of the permanent magnet 100 are separately performed.

In contrast, in the present disclosure, when the insertion process of the permanent magnet 100 is performed, even when the outer side surfaces of the rotor core 200 are subject to press-fitted, the permanent magnet 100 is protected without being damaged because it is wrapped with the injection part 110. As a result, the permanent magnet pocket 100 and 110 is assembled to the rotor core 200 and the press-fitting process of the sleeve 300 may be performed at the same time. In other words, there is an effect that the time required for manufacturing may be shortened by simultaneously performing the two manufacturing processes that have been carried out separately in the related art.

On the other hand, after the assembling step S200 of the manufacturing method for a motor core assembly according to the present disclosure, the manufacturing method may further include a recycling step S300 of the permanent magnet pocket by removing the permanent magnet pocket 100 and 110 from the insertion part of the rotor core.

Briefly looking at a process of recovering and recycling the conventional permanent magnet 100, a heat treatment process of the rotor core 200, a process of disassembling or crushing the permanent magnet 100 to separate cured epoxy and the permanent magnet 100, a process of sintering and re-manufacturing the permanent magnet 100, and the like are performed.

In contrast, by using the shape or properties of the injection part 110 wrapped along the perimeter of the permanent magnet 100, the manufacturing method for a motor core assembly according to the present disclosure may eliminate the process of disassembling or crushing the existing permanent magnet 100 and the process of re-manufacturing the permanent magnet 100.

Specifically, by using the grip part or parts 120 provided on the injection part 110 or by using a material that has the phase change under a specific temperature condition or a material that is decomposed under a specific pH concentration condition, as the injection part 110, the permanent magnet pocket 100 and 110 may be recycled. These are individually considered in more detail below.

First, in the recycling step S300 of the manufacturing method for a motor core assembly according to the present disclosure, the rotor core is heat-treated. In a state in which the rotor core is heated, the permanent magnet pocket is removed from the insertion part of the rotor core through use of the grip parts 120 provided on the outer surface of the injection part in S310.

As described above with reference to FIG. 2, the grip part or parts 120 are made of the same material as the injection part 110 and are manufactured together when the permanent magnet pocket 100 and 110 is manufactured by the insert injection method.

In addition, as shown in FIG. 2, the grip part or parts 120 are configured to protrude on the outer surface of the injection part 110 and thus enable the permanent magnet pocket 100 and 110 to be easily pulled in a direction away from the insertion part 210 of the rotor core 200.

In other words, in the recycling step S300 of the manufacturing method for a motor core assembly according to the present disclosure, the permanent magnet pocket is removed from the insertion part of the rotor core through the grip parts provided on the outer surface of the injection part in S310. Thus, the permanent magnet 100 is allowed to be recovered while maintaining the state of being wrapped with the injection part 110.

In this case, the recovered permanent magnet pocket 100 and 110 may be recycled by being inserted into a rotor core 200 of a new rotor. Accordingly, the process of disassembling or crushing the existing permanent magnet 100 and the process of re-manufacturing the permanent magnet 100 are eliminated. Thus, there is an effect of reducing the number of manufacturing processes and of saving a cost price.

On the other hand, when the permanent magnet pocket 100 and 110 is pulled in the direction away from the insertion part 210 of the rotor core 200 through use of the grip parts 120, the inner surfaces of the insertion part 210 of the rotor core 200 and the outer surfaces of the permanent magnet pocket 100 and 110 rub against each other, whereby the surfaces of the permanent magnet pocket 100 and 110 may be damaged. Accordingly, the injection part 110 provided on the surfaces of the permanent magnet pocket 100 and 110 may be peeled off. Or, when there are surfaces of the permanent magnet 100 on which the injection part 110 is not provided as necessary (for example, upper and lower surfaces of the permanent magnet 100), a problem in that the permanent magnet 100 is directly damaged may occur.

Therefore, in the recycling step S300 of the manufacturing method for a motor core assembly according to the present disclosure, the rotor core is heat-treated so as to be thermally expanded. In a state in which the rotor core is heated and thermally expanded in this way, the permanent magnet pocket is removed from the insertion part of the rotor core through use of the grip parts provided on the outer surface of the injection part in S310. Thus, the inner surfaces of the insertion part 210 of the rotor core 200 and the outer surfaces of the permanent magnet pocket 100 and 110 may be prevented from being rubbed against each other.

Next, in the recycling step S300 of the manufacturing method for a motor core assembly according to the present disclosure, the motor core assembly is heated to a temperature no less than the operating temperature of the motor so that the injection part 110 undergoes a phase change to a liquid state. Thus, the permanent magnet and the injection part are separated from each other in S320. Alternatively, the motor core assembly is immersed in an acidic solution so that the injection part is decomposed, whereby the permanent magnet and the injection part are separated from each other in S330.

The removal method of the permanent magnet pocket 100 and 110 using the grip part 120 described above corresponds to a physical method. Thus, when the permanent magnet pocket 100 and 110 is removed, there may be a problem in that the injection part 110 provided on the surfaces of the permanent magnet pocket 100 and 110 is peeled off. This may also occur even when the heat treatment of the rotor core 200 has been performed, depending on the level of the work performance capability of a worker.

Therefore, it may also be necessary to provide a method for completely recovering only the permanent magnet 100 without recovering the permanent magnet 100 that is wrapped with the injection part 110.

Specifically, in the recycling step S300 of the manufacturing method for a motor core assembly according to the present disclosure, by using a material that undergoes the phase change under a specific temperature condition as the injection part, the phase change of the injection part may be achieved. Thus, the permanent magnet and the injection part are separated from each other in S320. Alternatively, by using a material that is decomposed under a specific pH concentration condition, as the injection part, the injection part is decomposed into additives and polymers. Thus, the permanent magnet and the injection part are separated from each other in S330. Accordingly, the undamaged permanent magnet 100 can be recovered in its existing form.

Here, the specific temperature condition may be understood to mean a temperature condition no less than the operating temperature of the motor. The specific pH concentration condition may be understood to mean a condition corresponding to an acidic solution (i.e., no greater than pH 6).

More specifically, a typical motor is operated at a temperature of less than 200° C., so a material, which experiences a phase change to a liquid state only under conditions above the operating temperature of the motor, should be used for the injection part 100. Thus, the permanent magnet 100 not being damaged may be recovered in its existing state by heating the permanent magnet pocket 100 and 110 when the motor is disposed of.

Similarly, as previously seen, a material (for example, poly diketoenamine, PDK), which is decomposed by being immersed in an acidic solution, may be used for the injection part 110. Thus, when the motor is disposed of, the permanent magnet 100 not being damaged may be recovered in its existing form by immersing the permanent magnet pocket 100 and 110 in an acidic solution.

For reference, it is natural that all materials that may have the phase change to a liquid state at a temperature no less than the operating temperature of the motor or other various materials having the property of being decomposed when immersed in an acidic solution may be used as the material for the injection part 110 mentioned here. In other words, the foregoing is only provided as an example description to help understand the present disclosure. The content of the present disclosure is not limited by such description.

As a result, by performing this step, the permanent magnet 100 not being damaged may be recovered as is, and the recovered permanent magnet 100 may be recycled or reused by the process of inset injection molding, i.e., the insert injection method, again.

In other words, it is possible to use the permanent magnet 100 recovered from the existing motor without the need to secure an additional permanent magnet 100 for manufacturing a new motor. Accordingly, there are effects that the manufacturing cost of the new motor is reduced and the process of disassembling or crushing the existing permanent magnet 100 and the process of remanufacturing the permanent magnet 100 may be eliminated.

Therefore, as described above, according to the motor core assembly and the manufacturing method for the motor core assembly according to the present disclosure, by inserting the permanent magnet 100 wrapped with the injection part 110 into the rotor core 200, there are advantages in that, when the motor is disposed of, the permanent magnet 100 inside the motor may be recovered in its original state as is without damage and at a relatively low cost. Ultimately, the number of manufacturing processes and the cost may also be reduced.

Although shown and described in relation to specific embodiments of the present disclosure, it should be apparent to those of ordinary skill in the art that the present disclosure may be variously improved and changed without departing from the spirit of the present disclosure provided by the following claims.

What is claimed is:

1. A manufacturing method for a motor core assembly, the motor core assembly comprising:

a rotor core provided with opening parts on one side and insertion parts indented from the opening parts, respectively, toward an inside of the rotor core; and permanent magnet pockets, wherein each permanent magnet pocket is inserted and assembled into the insertion part through the opening part of the rotor core, includes a permanent magnet and an injection part wrapping the permanent magnet along a perimeter of the permanent magnet, and is inserted into the rotor core so that an outer surface of the injection part is in close contact with an inner surface of the insertion part, the manufacturing method comprising:

a manufacturing step of forming a permanent magnet pocket by an insert injection of an injection part along a perimeter of the permanent magnet;

an assembling step of assembling the permanent magnet pocket and the rotor core by inserting the permanent magnet pocket into the insertion part of the rotor core;

and, after the assembling step, a recycling step of recycling the permanent magnet pocket by removing the permanent magnet pocket from the insertion part of the rotor core.

2. The manufacturing method of claim 1, wherein one side of the permanent magnet pocket inserted into the rotor core is exposed through the opening part, and wherein grip parts are provided on an outer surface of an exposed side of the injection part.

3. The manufacturing method of claim 1, wherein the permanent magnet pocket is configured such that the injection part wraps four surfaces, except for upper and lower surfaces, of the permanent magnet.

4. The manufacturing method of claim 1, wherein the injection part is configured to have a phase change to a liquid state at a temperature no less than an operating temperature of a motor, so as to be separated from the permanent magnet.

5. The manufacturing method of claim 1, wherein, when immersed in an acidic solution, the injection part is decomposed to be separated from the permanent magnet.

6. The manufacturing method of claim 1, wherein, in the assembling step, the rotor core is heat-treated, and the permanent magnet pocket is inserted into the insertion part of the rotor core while the rotor core is in a state of being heated.

7. The manufacturing method of claim 6, wherein, in the assembling step, in a state in which the permanent magnet pocket is inserted into the insertion part of the heat-treated rotor core, outer side surfaces of the rotor core are press-fitted.

8. The manufacturing method of claim 1, wherein, in the recycling step, the rotor core is heat-treated, and in a state in which the rotor core is heated, the permanent magnet pocket is removed from the insertion part of the rotor core through grip parts provided on an outer surface of the injection part.

9. The manufacturing method of claim 1, wherein, in the recycling step, the motor core assembly is heated to a temperature no less than an operating temperature of a motor so that the injection part has a phase change to a liquid state, whereby the permanent magnet and the injection part are separated from each other.

10. The manufacturing method of claim 1, wherein, in the recycling step, the motor core assembly is immersed in an acidic solution so that the injection part is decomposed, whereby the permanent magnet and the injection part are separated from each other.

* * * * *